(12) United States Patent
Moribe

(10) Patent No.: US 10,026,156 B2
(45) Date of Patent: Jul. 17, 2018

(54) INFORMATION PROCESSING APPARATUS, INFORMATION PROCESSING METHOD, AND MEDIUM

(71) Applicant: CANON KABUSHIKI KAISHA, Tokyo (JP)

(72) Inventor: Shoei Moribe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 14/933,520

(22) Filed: Nov. 5, 2015

(65) Prior Publication Data

US 2016/0142587 A1 May 19, 2016

(30) Foreign Application Priority Data

Nov. 14, 2014 (JP) ................ 2014-231617

(51) Int. Cl.
*G06T 5/00* (2006.01)
*H04N 1/387* (2006.01)
*G06T 3/40* (2006.01)

(52) U.S. Cl.
CPC ............ *G06T 5/003* (2013.01); *G06T 3/4053* (2013.01); *H04N 1/3871* (2013.01)

(58) Field of Classification Search
CPC ..... G06T 5/003; G06T 3/4053–3/4076; H04N 1/3871
See application file for complete search history.

(56) References Cited

U.S. PATENT DOCUMENTS

| | | | |
|---|---|---|---|
| 7,889,949 B2 | 2/2011 | Cohen et al. | |
| 2003/0007186 A1* | 1/2003 | Suino | G06K 15/02 358/3.15 |
| 2003/0026495 A1* | 2/2003 | Gondek | G06T 5/20 382/261 |
| 2004/0208388 A1* | 10/2004 | Schramm | G06T 5/002 382/254 |
| 2007/0177817 A1* | 8/2007 | Szeliski | G06T 5/003 382/275 |
| 2008/0180749 A1* | 7/2008 | Pollard | G06T 5/50 358/3.24 |

(Continued)

FOREIGN PATENT DOCUMENTS

JP    2007-243348 A    9/2007

*Primary Examiner* — Sean Motsinger
(74) *Attorney, Agent, or Firm* — Carter, DeLuca, Farrell & Schmidt, LLP

(57) ABSTRACT

An object of the present invention is to provide a technique related to correction processing that can be applied to a variety of pieces of information with different resolutions, specifically, related to processing to increase resolution. The present invention is an information processing apparatus including: an acquisition unit configured to acquire first subject information and second subject information for the same subject; and a correction unit configured to increase the resolution of the second subject information based on similarity between the first subject information and the second subject information, and the first subject information and the second subject information are map data representing different physical quantities or map data representing the same physical quantity acquired by different measuring methods or different measuring devices.

11 Claims, 9 Drawing Sheets

(56) References Cited

U.S. PATENT DOCUMENTS

| | | | | |
|---|---|---|---|---|
| 2008/0260265 A1* | 10/2008 | Silverstein | ............... | G06T 5/50 |
| | | | | 382/232 |
| 2008/0310749 A1* | 12/2008 | Liao | ......................... | G06T 7/12 |
| | | | | 382/260 |
| 2009/0322891 A1* | 12/2009 | Kondo | .................. | G06T 3/4038 |
| | | | | 348/218.1 |
| 2015/0187054 A1* | 7/2015 | Asano | .................... | G06T 5/006 |
| | | | | 382/167 |
| 2015/0256843 A1* | 9/2015 | Roskowski | ............ | H04N 7/188 |
| | | | | 382/246 |
| 2016/0142587 A1* | 5/2016 | Moribe | ................... | G06T 5/003 |
| | | | | 382/167 |
| 2016/0173793 A1* | 6/2016 | Mitsunaga | ............. | H04N 9/045 |
| | | | | 348/229.1 |

* cited by examiner

COLOR IMAGE OF
OIL PAINTING  ~101

CONCAVO-CONVEX IMAGE OF
OIL PAINTING  ~102

CONCAVO-CONVEX IMAGE
(LOW RESOLUTION) ~103

COLOR IMAGE ~104

~105

CONCAVO-CONVEX IMAGE
(HIGH RESOLUTION)

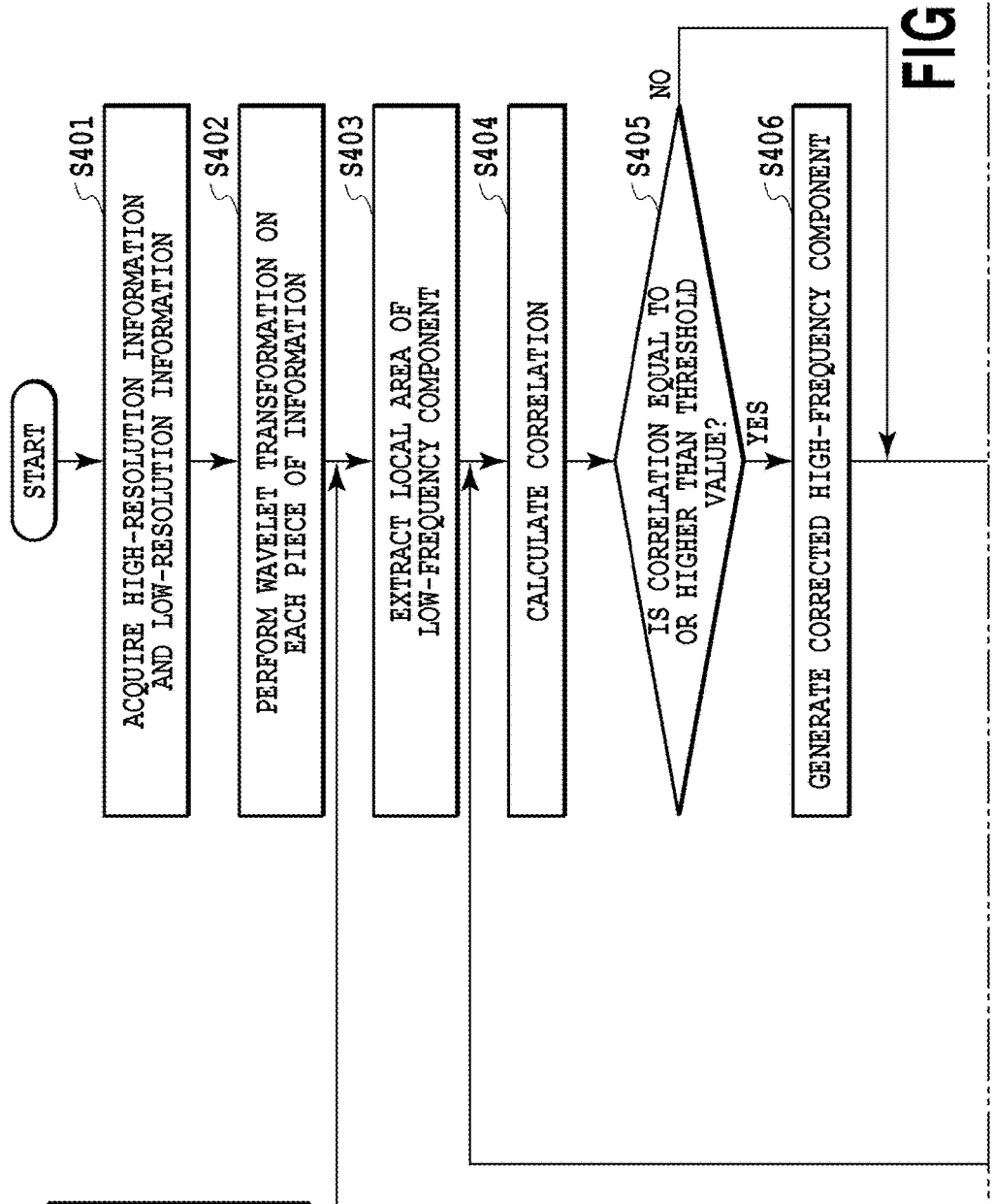

INFORMATION PROCESSING APPARATUS, INFORMATION PROCESSING METHOD, AND MEDIUM

BACKGROUND OF THE INVENTION

Field of the Invention

The present invention relates to an information processing apparatus that increases the resolution of second information by using first information, an information processing method, and a medium.

Description of the Related Art

In recent years, a variety of methods for acquiring information other than color information on a subject are known. The kinds of information that is acquired ranges over various kinds of information, such as distance information indicating a distance to the subject, shape information indicating the shape of the subject, and a bidirectional reflectance distribution function (BRDF).

Among these various kinds of subject information, there is information that is difficult to acquire with a high resolution. For example, as a method for acquiring distance information, the method is known in which feature points of a subject are extracted by using a plurality of images and the principle of triangulation is used based on the correspondence relationship between the feature points. With this method, only the distance information at the feature points is acquired and in areas other than the feature points, the distance information is estimated by using interpolation processing. Because of this, the resolution is reduced depending on the number of feature points.

On the other hand, a method has been proposed in which processing to increase resolution is performed on acquired image information. U.S. Pat. No. 7,889,949 has disclosed a method for performing processing to increase the resolution of image information by using a plurality of images with different resolutions. In this method, the pixel of a high-resolution image corresponding to the pixel of interest of a low-resolution image is referred to and in accordance with the difference between both pixel values, the intensity of filtering at the time of processing to increase resolution is changed.

Japanese Patent Laid-Open No. 2007-243348 has disclosed a method for correcting a reduction in resolution resulting from floating of a document in a document reading apparatus including a distance sensor. In this method, filtering processing for an image is changed in accordance with the measured distance.

SUMMARY OF THE INVENTION

However, the targets to which the method of U.S. Pat. No. 7,889,949 can be applied are limited. This method premises that there is a sufficient correlation between a low-resolution image and a high-resolution image in the entire area of an image. In the case where the premise is not met, there is a possibility that correction will become excessive and that an unnatural artifact (disturbance in image) will occur. Consequently, the case where this method appropriately functions is limited to only a case where a high-resolution image is restored after the resolution of which has been reduced for the purpose of reducing the amount of calculation and the amount of data to be transferred. On the other hand, application of this method to the case where the resolution of low-resolution distance information is increased by using, for example, a high-resolution color image may result in a possibility that the above-described overcorrection will occur because the correlation between images is not guaranteed.

The case where the method of Japanese Patent Laid-Open No. 2007-243348 can be applied is limited to the use in which the resolution of image information is increased by using distance information because the phenomenon in which the amount of blurring of an image changes in accordance with the distance is utilized. Consequently, it is not possible to increase the resolution of the distance information itself. Further, the correction is simple filter correction, and therefore, it is not possible to restore the lost high-frequency component, resulting in a limitation to the correction effect.

An object of the present invention is to provide a technique related to correction processing that can be applied to a variety of pieces of information with different resolutions, specifically, related to processing to increase resolution.

The present invention is an information processing apparatus including: an acquisition unit configured to acquire first subject information and second subject information for the same subject; and a correction unit configured to increase the resolution of the second subject information based on similarity between the first subject information and the second subject information, and the first subject information and the second subject information are map data representing different physical quantities or map data representing the same physical quantity acquired by different measuring methods or different measuring apparatuses.

Further features of the present invention will become apparent from the following description of exemplary embodiments (with reference to the attached drawings).

BRIEF DESCRIPTION OF THE DRAWINGS

FIG. 4 is a diagram showing the relationship of FIG. 4A and FIG. 4B;

FIG. 4A and FIG. 4B are flowcharts of processing according to the first embodiment;

DESCRIPTION OF THE EMBODIMENTS

In the following, with reference to the attached drawings, the present invention is explained in detail based on preferred embodiments. Configurations shown in the following embodiments are merely exemplary and the present invention is not limited to the configurations shown schematically.

First Embodiment (Wavelet Transformation is
Performed to Acquire Low-Frequency Components
and High-Frequency Components and in the Case
where there is a Correction Between the
Low-Frequency Components, the High-Frequency
Components are Corrected)

(Outline of Processing)

Figure 1A:
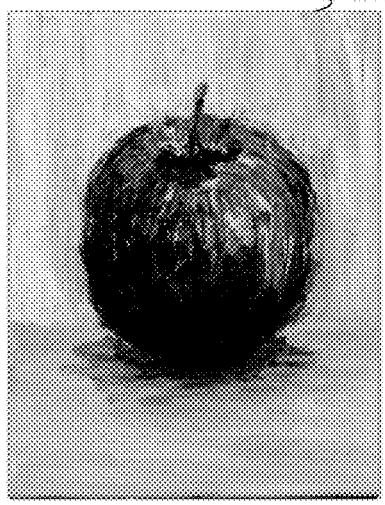
FIG. 1A and FIG. 1B are conceptual diagrams of processing according to a first embodiment.
Figure 1A:
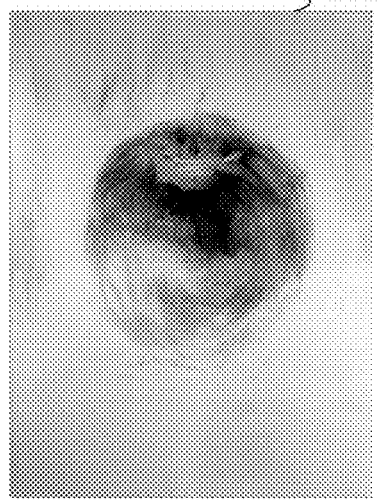
Figure 1B:
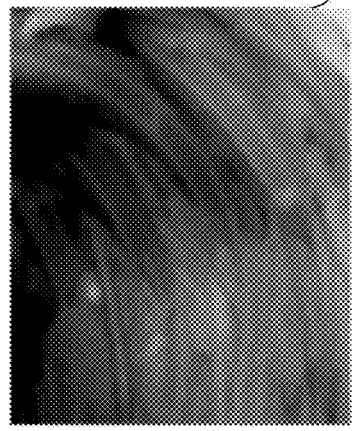
Figure 1B:
Figure 1B:
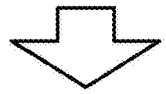
Figure 1B:
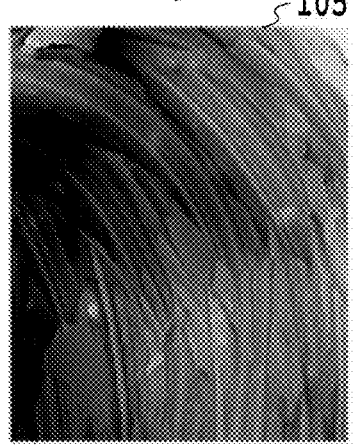

FIG. 1A and FIG. 1B are conceptual diagrams of processing according to the present embodiment. In the present embodiment, a color image 101 that is a high-resolution image and a concavo-convex image 102 that is a low-resolution image as illustrated in FIG. 1A are acquired, both images being acquired by capturing images of the same subject. By the correction using the color image 101, the resolution of the concavo-convex image 102 is increased. In FIG. 1B, an image 103 is a partially enlarged view of the concavo-convex image 102, an image 104 is a partially enlarged view of the color image 101, and an image 105 is a partially enlarged view of the concavo-convex image after the processing according to the present embodiment. From FIG. 1B, it is known that the resolution of the concavo-convex image has been increased as the results of the processing according to the present embodiment.

(Input Information)

In the present embodiment, as input information, two pieces of subject information with different resolutions are used. The subject information is map data representing the physical quantity of a subject and data is arranged for each area.

In the present embodiment, as low-resolution information, concavo-convex information on a concavo-convex image acquired by the publicly known light-section method is used. The light-section method is a method for acquiring the shape of a target by measuring distortion of slit light projected onto the target object by a camera or the like. The light-section method is a method capable of acquiring a change in shape whose frequency is comparatively low (gradual change in shape), but in order to acquire a change in shape whose frequency is high (rapid change in shape), an enormous amount of slit light data is necessary, and therefore, a long measuring time and an increase in size of the apparatus will be necessary. Consequently, in the present embodiment, only a change in shape whose frequency is low is obtained from a small amount of slit light data.

As high-resolution information, color information of a color image captured by a common camera is used. The resolution of a recent camera has been increased and it is possible to easily acquire a high-resolution color image by one-time image capturing.

(Configuration of Apparatus)

Figure 2:
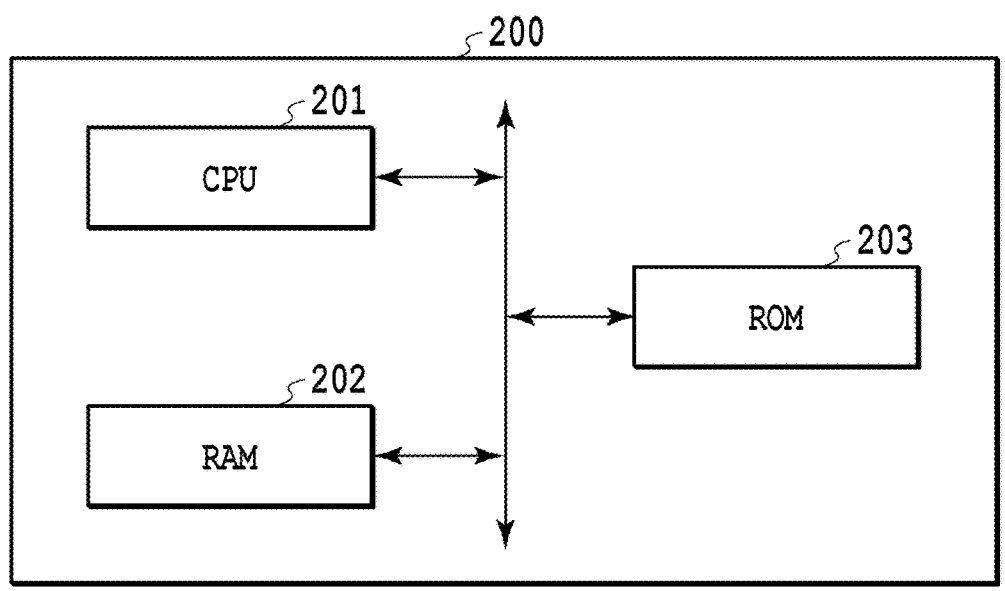
FIG. 2 is a block diagram showing a hardware configuration of an image processing apparatus according to the first embodiment.

FIG. 2 is a block diagram showing an example of a hardware configuration of an information processing apparatus 200 according to the present embodiment. The information processing apparatus 200 according to the present embodiment is an apparatus including, for example, a CPU 201, a RAM 202, and a ROM 203, and is mounted on an apparatus capable of acquiring concavo-convex information, such as a camera and a scanner.

The CPU (Central Processing Unit) 201 performs the function of a software component, to be described later in explanation of FIG. 3, by executing a program. The RAM (Random Access Memory) 202 can be accessed by the CPU 201 and is used as a destination where a memory necessary to execute a program is secured. In the ROM (Read Only Memory) 203, a program used to perform processing, to be described later in explanation of FIG. 4A and FIG. 4B, is stored. This program is developed onto the RAM 202 and is executed by the CPU 201.

Figure 3:
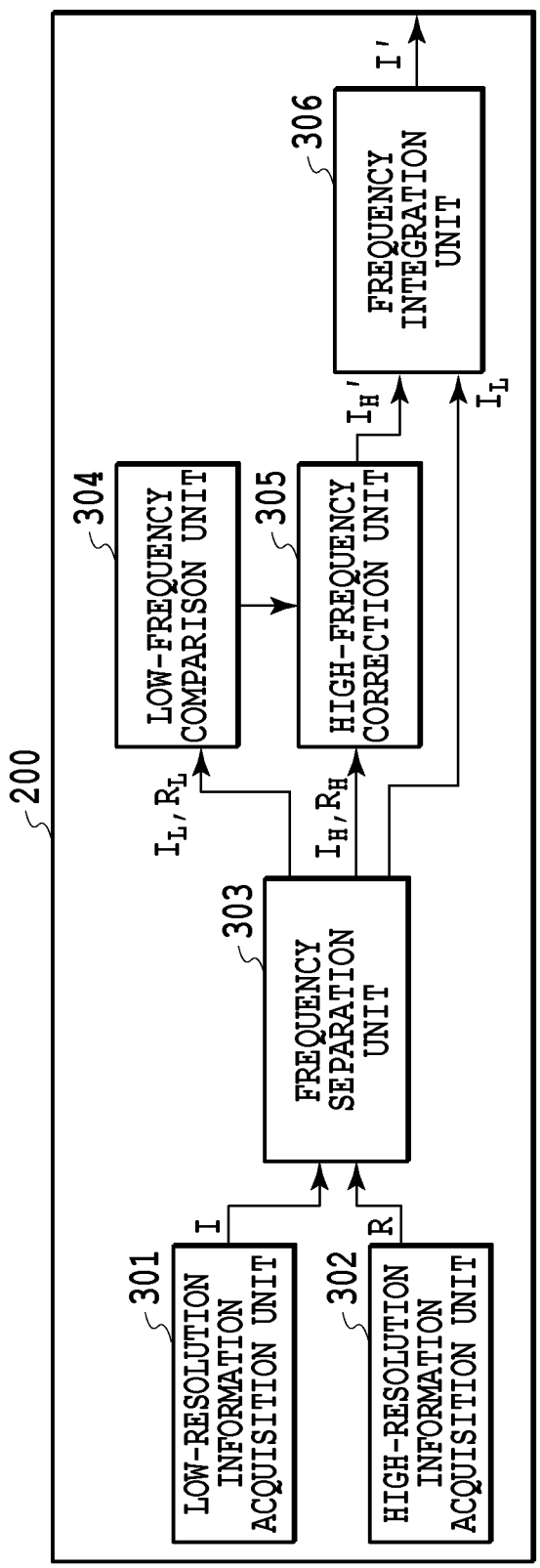
FIG. 3 is a block diagram showing a software configuration of the information processing apparatus according to the first embodiment.
Figure 4B:
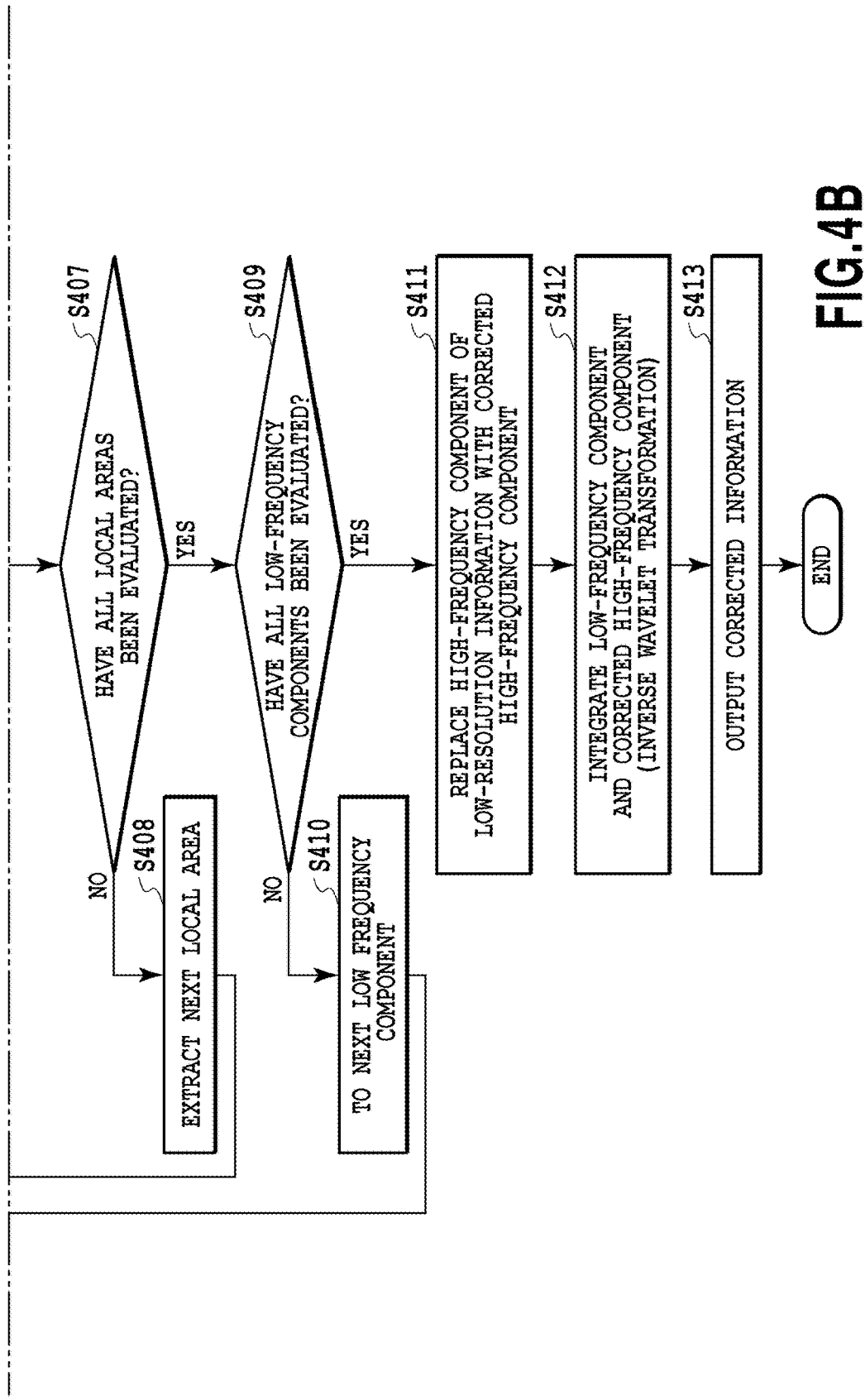

FIG. 3 is a block diagram showing a software configuration of the information processing apparatus 200 according to the present embodiment. Each component of the information processing apparatus 200 that is explained below is implemented by the CPU 201 of the information processing apparatus 200 executing a predetermined program.

A low-resolution information acquisition unit 301 acquires concavo-convex information as low-resolution information I and sends the acquired low-resolution information I to a frequency separation unit 303. A high-resolution information acquisition unit 302 acquires color information as high-resolution information R and sends the acquired high-resolution information R to the frequency separation unit 303.

The frequency separation unit 303 acquires the low-resolution information I sent from the low-resolution information acquisition unit 301 and the high-resolution information R sent from the high-resolution information acquisition unit 302 and performs frequency separation processing on the low-resolution information I and the high-resolution information R. As the results of the frequency separation processing, the low-resolution information I is separated into a high-frequency component $I_H$ and a low-frequency component $I_L$. Further, the high-resolution information R is separated into a high-frequency component $R_H$ and a low-frequency component $R_L$. As a method of frequency separation, the publicly known discrete wavelet transformation is used. The discrete wavelet transformation will be explained later in detail. The frequency separation unit 303 sends the low-frequency component $I_L$ of the low-resolution information I and the low-frequency component $R_L$ of the high-resolution information R to a low-frequency comparison unit 304, and sends the high-frequency component $I_H$ of the low-resolution information I and the high-frequency component $R_H$ of the high-resolution information R to a high-frequency correction unit 305. Further, the frequency separation unit 303 sends the low-frequency component $I_L$ of the low-resolution information I to a frequency integration unit 306.

The low-frequency comparison unit 304 acquires the low-frequency components $I_L$ and $R_L$ sent from the frequency separation unit 303 and compares both. In the case where the results of the comparison indicate that there is a high correlation between both, the low-frequency comparison unit 304 sends the low-frequency components $I_L$ and $R_L$ to the high-frequency correction unit 305. Details of the processing that is performed by the low-frequency comparison unit 304 will be described in explanation of a processing flow, to be described later.

The high-frequency correction unit 305 acquires the high-frequency components $I_H$ and $R_H$ sent from the frequency separation unit 303 and the low-frequency components $I_L$ and $R_L$ sent from the low-frequency comparison unit 304. The high-frequency correction unit 305 generates a corrected high-frequency component $I_H'$ based on the comparison results acquired from the low-frequency comparison unit 304. Details of the processing that is performed by the high-frequency correction unit 305 will be described in explanation of a processing flow, to be described later.

The frequency integration unit 306 acquires the low-frequency component $I_L$ sent from the frequency separation unit 303 and the corrected high-frequency component $I_H'$ sent from the high-frequency correction unit 305 and generates corrected information I' by integrating those components. As a method of frequency integration, the publicly known inverse discrete wavelet transformation is used. The frequency integration unit 306 outputs the generated corrected information I'.

(Flow of Processing)

In the following, a flow of processing that is performed by the information processing apparatus 200 according to the present embodiment, which includes the above-described function configurations, is explained by using FIG. 4A and FIG. 4B.

First, at step S401 (hereinafter, "step S401" is abbreviated to "S401" and other steps are also abbreviated similarly), the frequency separation unit 303 acquires the low-resolution information I sent from the low-resolution information acquisition unit 301 and the high-resolution information R sent from the high-resolution information acquisition unit 302.

Figure 5:
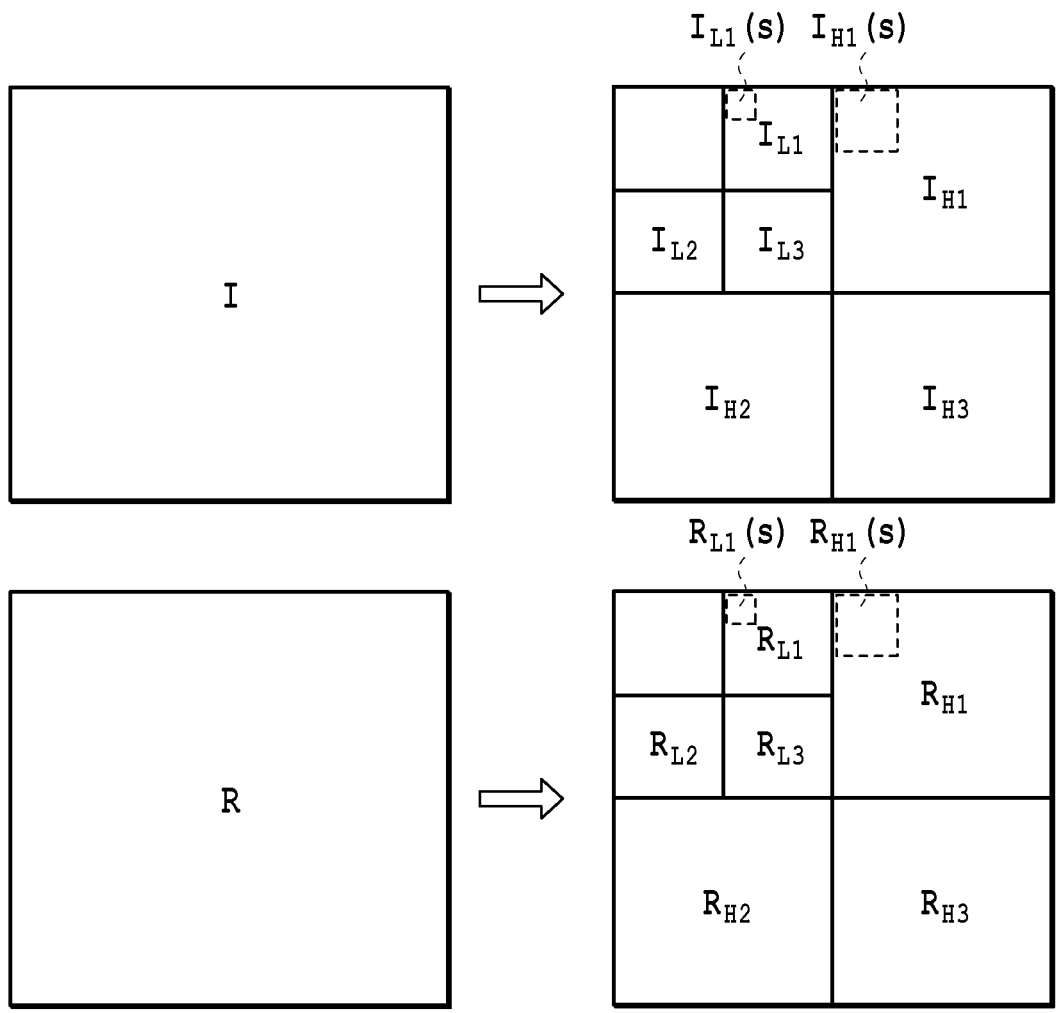
FIG. 5 is a schematic diagram showing discrete wavelet transformation at level 2.

Next, at S402, the frequency separation unit 303 performs frequency separation processing on the low-resolution information I and the high-resolution information R. As a method of frequency separation, the publicly known discrete wavelet transformation is used. FIG. 5 shows a schematic diagram representing the results of the discrete wavelet transformation. The low-resolution information I is separated into the high-frequency component $I_H$ and the low-frequency component $I_L$. The high-frequency component $I_H$ and the low-frequency component $I_L$ are separated into $I_{H1}$, $I_{H2}$, and $I_{H3}$, and $I_{L1}$, $I_{L2}$, and $I_{L3}$, respectively, in accordance with the directions of the waveform (i.e., the horizontal direction, the vertical direction, and the diagonal direction). The high-resolution information R is similarly separated. The frequency separation unit 303 sends the low-frequency components $I_{L1}$ to $I_{L3}$, and $R_{L1}$ to $R_{L3}$ to the low-frequency comparison unit 304 and sends the high-frequency components $I_{H1}$ to $I_{H3}$, and $R_{H1}$ to $R_{H3}$ to the high-frequency correction unit 305.

Next, at S403, the low-frequency comparison unit 304 extracts the component corresponding to a local area from the low-frequency components $I_{L1}$ and $R_{L1}$. In FIG. 5, components $I_{L1}$ (s) and $R_{L1}$ (s) each corresponding to a local area surrounded by a broken line frame are shown as an example of a component corresponding to a local area. Here, s is an index for specifying a local area. In the present embodiment, the local area is a square and the length of the side is set to ¼ of one side of the $I_{L1}$ area, which is a square. The initial position of the local area agrees with the top-left of the $I_{L1}$ area.

Next, at S404, the low-frequency comparison unit 304 calculates a correlation between the low-frequency component $I_{L1}$ (s) corresponding to a local area and the low-frequency component $R_{L1}$ (s) corresponding to a local area. The higher the correlation, the more the waveforms whose frequency is low in the same direction exist in the local area of interest.

Next, at S405, the low-frequency comparison unit 304 performs threshold value determination for the calculated correlation. In the present embodiment, a threshold value T is set to 0.5 as a preset value. In the case where the results of the determination indicate that the correlation is equal to or higher than the threshold value, the processing proceeds to S406 after the low-frequency comparison unit 304 sends the low-frequency components $I_{L1}$ (s) and $R_{L1}$ (s) to the high-frequency correction unit 305, and the processing proceeds to S407 in the case where the correlation is lower than the threshold value.

At S406, the high-frequency correction unit 305 generates a corrected high-frequency component $I_H'$ (s). Specifically, first, a high-frequency component $R_{H1}$ (s) corresponding to the local low-frequency component $R_{L1}$ (s) of the high-resolution information R is extracted. After that, $R_{H1}$ (s) normalized by (expression 1) below is taken to be a corrected high-frequency component $I_{H1}'$ (s).

$$I_{H1}'(s)=R_{H1}(s)\times \text{Ave}(I_{L1})/\text{Ave}(R_{L1}) \quad \text{(expression 1)}$$

Here, Ave ($R_{L1}$) and Ave ($I_{L1}$) are average values of signal values in $R_{L1}$ and $I_{L1}$, respectively. Next, the processing proceeds to S407.

At S407, the low-frequency comparison unit 304 determines whether the correlation has been evaluated for all the local areas in the low-frequency component of interest. In the case where the results of the determination indicate that there is an area that has not been evaluated yet, the processing proceeds to S408 and the low-frequency comparison unit 304 extracts the next local area and then the processing returns to S404 and a correlation is calculated. On the other hand, in the case where the results of the determination indicate that all the areas have been evaluated, the processing proceeds to S409.

At S409, the low-frequency comparison unit 304 determines whether the correlation has been evaluated for all the low-frequency components. In the present embodiment, for simplification of explanation, the level of the discrete wavelet transformation is set to 2, and therefore, the low-frequency component exists only in one stage, but in the case where the level is 3 or higher, the low-frequency components in two or more stages exist, and therefore, evaluation is performed for all the low-frequency components. In the case where the results of the determination indicate that there is a low-frequency component that has not been evaluated yet, the processing proceeds to S410 and the low-frequency comparison unit 304 focuses attention on the next low-frequency component, and the processing returns to S403 and the local area is extracted. On the other hand, in the case where the results of the determination indicate that all the low-frequency components have been evaluated, the processing proceeds to S411.

At S411, the high-frequency correction unit 305 replaces the high-frequency component $I_H$ of the low-resolution information I with the corrected high-frequency component $I_H'$. However, in the area where the correlation is low and correction is not performed, the original high-frequency component $I_H$ is used as it is as the corrected high-frequency component $I_H'$.

Next, at S412, the frequency integration unit 306 integrates the low-frequency component $I_L$ and the corrected high-frequency component $I_H'$ and generates the corrected information I'. As a method of frequency integration, the publicly known inverse discrete wavelet transformation is used.

Next, at S413, the frequency integration unit 306 outputs the corrected information I'.

As above, the series of processing related to the increasing of the resolution of low-resolution information is completed.

Effect

As explained above, according to the present embodiment, it is made possible to perform processing to increase the resolution of low-resolution information while checking the correlation between the low-resolution information and the high-resolution information for each local area. Because of this, unlike the prior art, it is made possible to perform processing to increase the resolution of a variety of pieces of information for which no correlation is guaranteed.

Further, the corrected high-frequency component $I_H'$ of the low-resolution information I is generated by using the high-resolution information R, and therefore, unlike the simple filter correction, it is also made possible to restore the lost high-frequency component.

Modification Example

Figure 6:
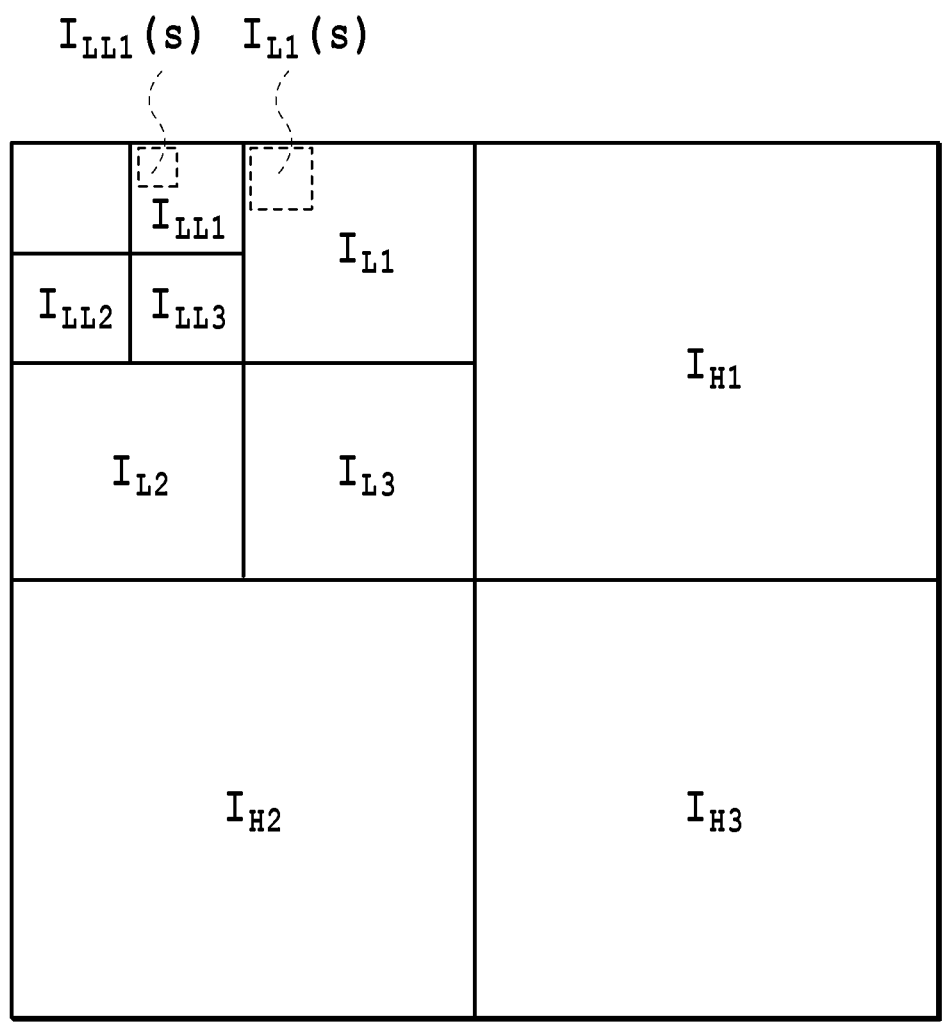
FIG. 6 is a schematic diagram showing discrete wavelet transformation at level 3.

In the example explained above, the level of the discrete wavelet transformation is set to 2, but the level of the discrete wavelet transformation may be 3 or higher. In such a case, at the time of correcting a frequency component at a certain level, the correlation between frequency components lower by one level than the certain level is evaluated. FIG. 6 shows an example of the case where the level of the wavelet transformation is 3. Whether or not the low-frequency component $I_{L1}$ (s) in FIG. 6 is corrected is determined based on the correlation between frequency components $I_{LL1}$ (s) and $R_{LL1}$ (s) whose level is lower by one level. The level at which a certain frequency is deemed to be a low frequency and the level at which a certain frequency is deemed to be a high frequency may be set arbitrarily and may be changed in accordance with a target whose image is to be captured and a purpose.

As a method of frequency separation, the discrete wavelet transformation is preferable, but the method is not limited to this. An arbitrary method (Fourier transformation or the like) for separating a high-frequency component from a low-frequency component can be used. Further, it is preferable to perform evaluation of a correlation by using only the low-frequency component, but it may also be possible to evaluate a correlation by including the high-frequency component. However, in such a case, an aspect is such that the correlation between the low-resolution information I and the high-resolution information R is calculated directly without performing local area extraction or frequency separation.

The size of the local area at the time of calculating a correlation is arbitrary and for example, the local area corresponding to the low-frequency component $I_{L1}$ (s) may agree with the area corresponding to the low-frequency component $I_{L1}$. The shape of the local area is not limited to a square. As an area determination method in the case where the local area is extracted sequentially, an arbitrary method may be used. It may also be possible to sequentially extract the local areas while preventing the local areas from overlapping each other, or to sequentially extract the local areas by sliding by a predetermined amount each time while allowing overlapping. The threshold value T used at S405 may be set arbitrarily. It may also be possible to change the threshold value for each local area or to change the threshold value for each frequency. Further, it may also be possible for the information processing apparatus 200 to include a display unit configured to display a user interface (UI) with which it is possible for a user to specify the degree of correction, such as a threshold value.

The example is shown in which the low-frequency comparison unit 304 determines similarity between the low-frequency component of the low-resolution information and the low-frequency component of the high-resolution information by calculating a correlation, but the method for determining similarity is not limited to the correlation evaluation. It is possible to use an arbitrary method for evaluating similarity between a plurality of pieces of information.

Further, it may also be possible to correct the similarity of the low-frequency component in the local area in accordance with the results of the similarity determination in the local area on the periphery of the local area of interest, in place of evaluating the similarity by the local area of interest alone.

Although the example is shown in which the high-frequency correction unit 305 extracts and normalizes the high-frequency component $R_{H1}$ (s) corresponding to the local low-frequency component $R_{L1}$ (s) of the high-resolution information R, but the normalization method and the correction method are not limited to those in the above-described example, and it may also be possible to use the correction with the publicly known filtering.

It is possible to switch between the above-described variety of settings in accordance with a target whose image is to be captured. For example, in the case where a user specifies the "oil painting mode" for capturing an image of an oil painting, it is preferable to perform correction by using parameters (level of the wavelet transformation, the size of the local area, the threshold value, etc.) that are set in advance so that the correction will become preferable for a plurality of oil paintings.

Second Embodiment (Image is Captured so that a Shadow is Generated by Devising the Image Capturing Method and a Shadow Image is Created)

In the following, a second embodiment is explained. In the first embodiment described above, the example is shown in which the corrected high-frequency component is generated and the resolution of the low-resolution information is increased on the premise that the high-frequency component of the low-resolution information is included in the high-resolution information.

However, depending on the acquisition condition of the high-resolution information, there is a case where the high-frequency component of the low-resolution information is not included in the high-resolution information. In this case, with the aspect shown in the first embodiment, there is a possibility that it will not be possible to sufficiently correct the low-resolution information.

Because of this, in the present embodiment, an example is explained in which consideration is taken into account in the stage of the high-resolution information acquisition so that the high-frequency component of the low-resolution information is included in the high-resolution information. In particular, as a specific example, explanation is given by taking the case where the subject is a substantially flat object including concavo-convex portions, such as an oil painting, as an example. Explanation of the portions in common to those of the first embodiment is simplified or omitted.

(Input Information)

In the present embodiment, as the low-resolution information, the concavo-convex information that is acquired by the publicly known light-section method is used as in the first embodiment. As the high-resolution information, shadow information on a shadow image that is created from a plurality of color images captured by an image capturing system, to be described later, is used.

(Configuration of Image Capturing System)

Figure 7:
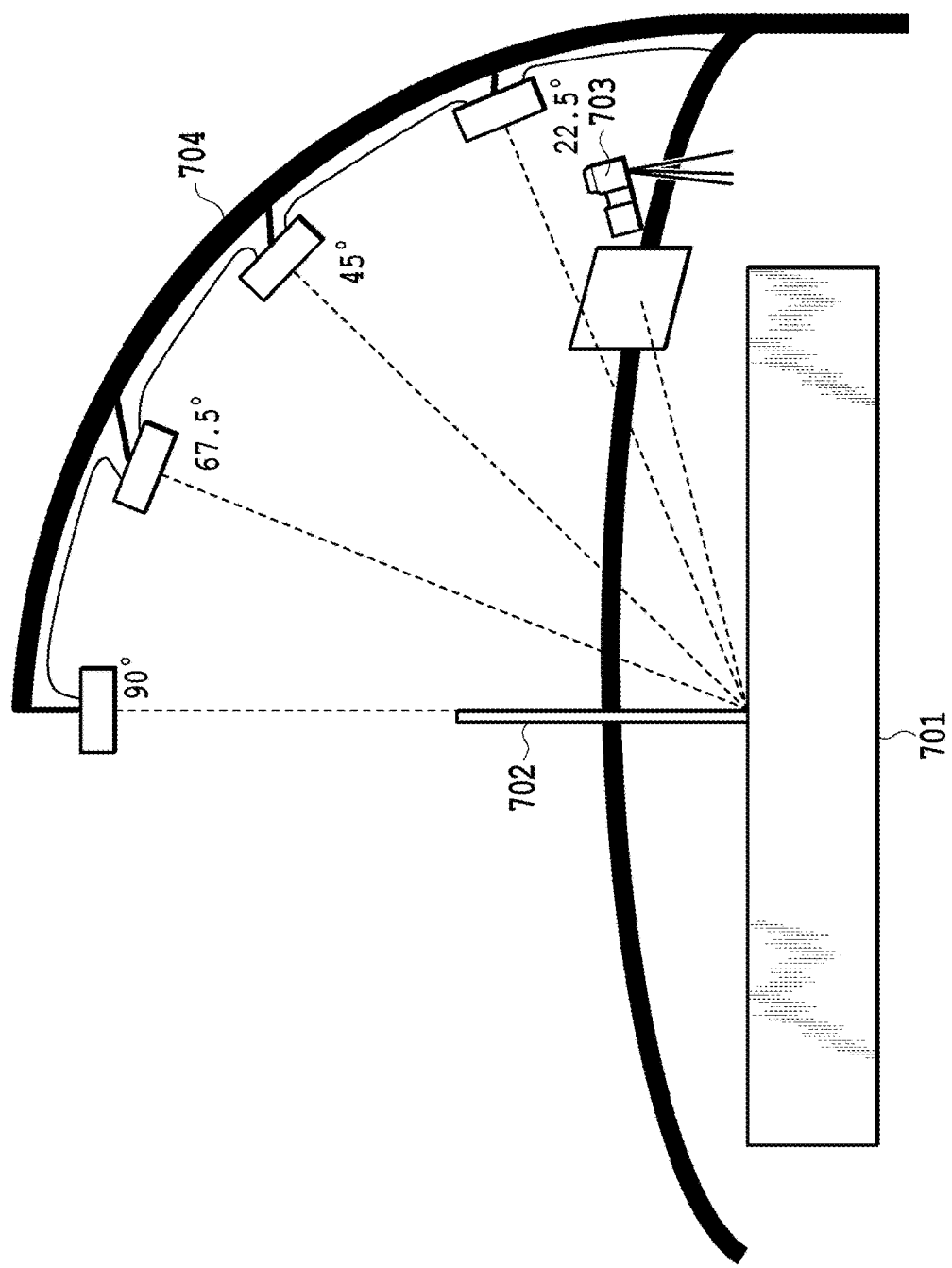
FIG. 7 is a configuration diagram of an image capturing system according to a second embodiment.

FIG. 7 is a configuration diagram of an image capturing system according to the present embodiment. In the center part of a rotary stage 701, a subject 702 is placed. In the present embodiment, the subject 702 is a substantially flat object including concavo-convex portions, such as an oil painting. The image of the subject 702 is captured by an image capturing device 703.

On the periphery of the rotary stage, a lighting system 704 is installed. The lighting system 704 includes four lighting fixtures whose installation angles are different. The four lighting fixtures are arranged so as to form with the center of the rotary stage 701 22.5 degrees, 45 degrees, 67.5 degrees, and 90 degrees, respectively. Further, it is possible for the lighting system 704 to individually control lighting-up of the four lighting fixtures.

In the present embodiment, the rotary stage 701 is rotated in five stages (i.e., 72 degrees each time) and an image is captured in the state where one of the four lighting fixtures is lit. Consequently, 20 (=5×4) color images in total with different image capturing conditions are obtained.

(Determination and Extraction of Shadow Area)

In the following, a method for generating high-frequency information (shadow information) including the high-frequency component of the low-resolution information (concavo-convex information) from the above-described 20 color images is described.

It can be considered that information having a high correlation with the high-frequency component of the concavo-convex information is obtained by extracting information on the area that forms a shadow from the images with different image capturing conditions, i.e., by creating a shadow image. Because of this, the pixel values are compared for each pixel of the above-described 20 images and the pixel whose difference in luminance is equal to or larger than a threshold value is regarded as a shadow area and extracted. A binary shadow image is created by allocating the pixel value 1 to the pixel determined to be a shadow area and allocating the pixel value 0 to other pixels. By creating the shadow image in this manner, shadow information is generated.

The generated shadow information is input to the information processing apparatus 200 explained in the first embodiment as high-resolution information. As the low-frequency information, the concavo-convex information is input.

Effect

As explained above, according to the present embodiment, aiming at that the high-resolution information includes the high-frequency component of the low-resolution information, as the high-resolution information, the shadow information on the shadow image created from the color images captured under a plurality of conditions is used. Because of this, it is possible to implement preferable increasing of the resolution of the low-resolution information compared to that in the case where the color information on a color image captured under one condition is used as the high-resolution information.

Modification Example

In the present embodiment, the shadow image is assumed to be a binary image, but the shadow image may be a multivalued image. For example, the difference in luminance may be stored as a pixel value. Further, the method for extracting a shadow area is not limited to that described above. For example, it may also be possible to calculate in advance a difference value from the adjacent pixel for each pixel and to regard a pixel whose amount of change in the difference value between images is equal to or greater than a threshold value as a shadow area.

The number of images to be captured is not limited to 20 and any number of images may be used. Further, the method for changing the image capturing condition is not limited to the method for switching between lighting fixtures. It is possible to change the image capturing condition by an arbitrary method, such as a method for moving a lighting fixture and a method for moving a camera.

In the present embodiment, as the low-resolution information, the concavo-convex information is used, but it may also be possible to use information other than the concavo-convex information as the low-resolution information. However, in such a case, the method is not limited to the method for extracting a pixel determined to be a shadow area, but an area extraction method in accordance with the kind of low-resolution information is used.

Third Embodiment (Two Pieces of Information that are Input May be the Same Kind of Information Representing the Same Physical Quantity. Further, the Low-Frequency Component May be Corrected Based on the Correlation Evaluation of the High-Frequency Component)

In the following, a third embodiment is explained. In the embodiments described above, the examples are shown in which the low-resolution concavo-convex information is corrected by using the high-resolution color information or the shadow information. However, the high-resolution information and the low-resolution information may be information representing the same physical quantity. Further, it may also be possible to correct the low-frequency component of the high-resolution information by using the low-resolution information.

Because of this, in the third embodiment, an example is explained in which as to two pieces of concavo-convex information whose resolutions are different, which are acquired by two different measuring methods, the low-frequency component of the high-resolution concavo-convex information is corrected by using the low-resolution concavo-convex information. Explanation of the portions in common to those of the above-described embodiments is simplified or omitted.

(Configuration of Apparatus)

Figure 8:
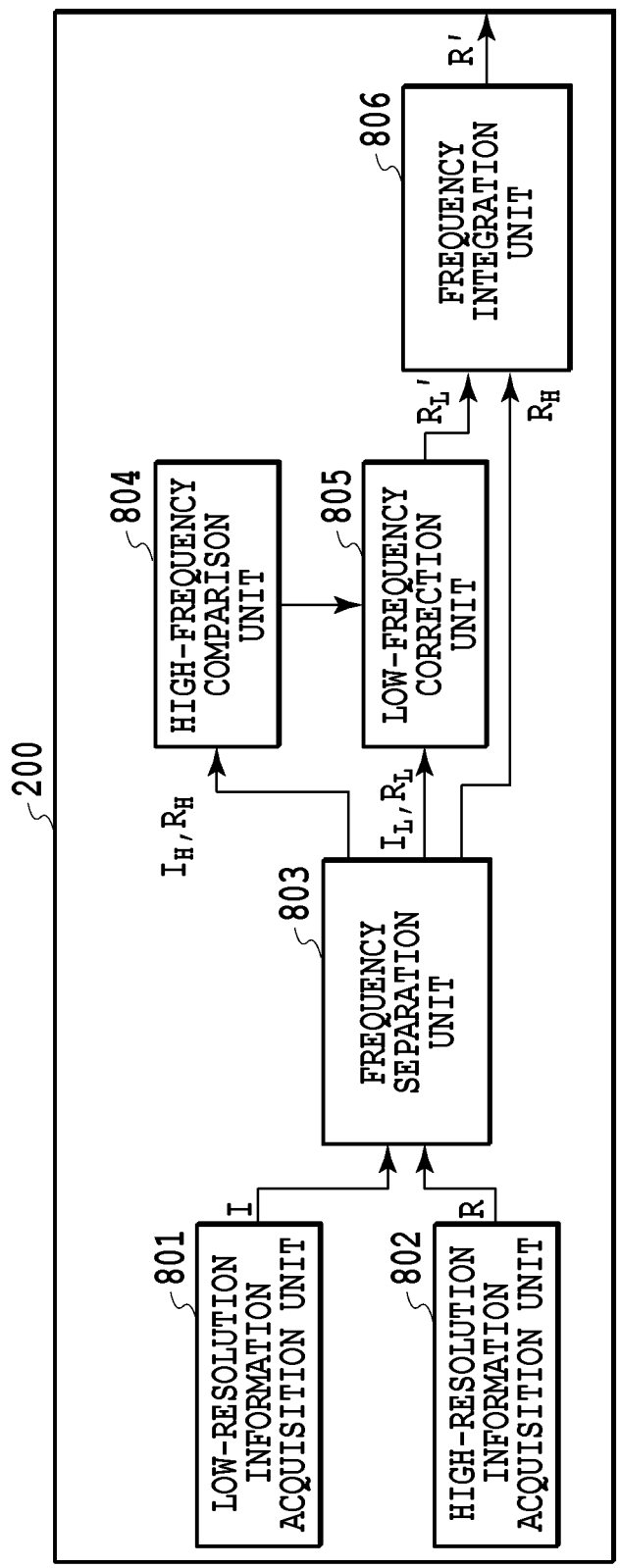
FIG. 8 is a block diagram showing a software configuration of an information processing apparatus according to a third embodiment.

FIG. 8 is a block diagram showing a software configuration of the information processing apparatus 200 according to the present embodiment. Each component of the information processing apparatus 200 that is explained below is implemented by the CPU 201 of the information processing apparatus 200 executing a predetermined program.

A low-resolution information acquisition unit 801 and a high-resolution information acquisition unit 802 are the same as those in the first embodiment (see FIG. 3).

A frequency separation unit 803 sends the high-frequency component $I_H$ of the low-resolution information I and the high-frequency component $R_H$ of the high-resolution information R to a high-frequency comparison unit 804, and sends the low-frequency component $I_L$ of the low-resolution information I and the low-frequency component $R_L$ of the high-resolution information R to a low-frequency correction unit 805. Further, the frequency separation unit 803 sends the high-frequency component $R_H$ of the high-resolution information R to a frequency integration unit 806.

The high-frequency comparison unit 804 acquires the high-frequency components $I_H$ and $R_H$ sent from the frequency separation unit 803 and compares both. In the case where the results of the comparison indicate that there is a high correlation between both, the high-frequency comparison unit 804 sends the high-frequency components $I_H$ and $R_H$ to the low-frequency correction unit 805. The low-frequency correction unit 805 acquires the low-frequency components $I_L$ and $R_L$ sent from the frequency separation unit 803 and generates a corrected low-frequency component $R_L'$ based on the comparison results acquired from the high-frequency comparison unit 804.

The frequency integration unit 806 acquires the high-frequency component $R_H$ sent from the frequency separation unit 803 and the corrected low-frequency component $R_L'$ sent from the low-frequency correction unit 805 and generates corrected information R' by integrating those components. As a method of frequency integration, the publicly known inverse discrete wavelet transformation is used.

(Input Information)

In the present embodiment, as the low-resolution information, the concavo-convex information acquired by the publicly known light-section method is used as in the first embodiment. As the high-resolution information, the concavo-convex information estimated from the shadow information acquired by the image capturing system explained in the second embodiment is used. In other words, the information representing the same physical quantity (concavo-convex information) as the low-resolution information is used as the high-resolution information. The estimation of the concavo-convex information from the shadow information makes use of the fact that the height of the concavo-convex portion can be estimated from the geometric relationship (the position relationship between the target, the lighting fixture, and the image capturing device) and the shadow image. The method for estimating the concavo-convex information from the shadow information is capable of quickly acquiring the high-frequency component, but on the other hand, as to the concavo-convex portion whose frequency is low, a clear shadow is not generated, and therefore, it is difficult to acquire the low-frequency component.

(Flow of Processing)

The processing flow according to the present embodiment is a processing flow in which the relationship between the low-resolution information and the high-resolution information in the first embodiment is reversed. In other words, the high-frequency comparison unit 804 extracts the components corresponding to the local area from the high- and low-frequency components $I_{H1}$ and $R_{H1}$, and calculates a correlation between a component $I_{H1}$ (s) and the component $R_{H1}$ (s) corresponding to the local area (see FIG. 4A and FIG. 4B).

In the case where the correlation is equal to or higher than a threshold value, the low-frequency correction unit 805 generates a corrected low-frequency component $R_L'$ (s). Specifically, first, the low-frequency component $I_{L1}$ (s) corresponding to the local high-frequency component $I_{H1}$ (s) of the low-resolution information I is extracted. After this, what is obtained by normalizing $I_{L1}$ (s) is taken to be a corrected low-frequency component $R_{L1}'$ (s).

The frequency integration unit 806 integrates the high-frequency component $R_H$ and the corrected low-frequency component $R_L'$ and generates the corrected information R'.

Effect

As explained above, according to the present embodiment, also in the case where the high-resolution information and the low-resolution information are information representing the same physical quantity, preferable correction is enabled. Further, it is possible to correct the low-frequency component of the high-resolution information by using the low-resolution information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to perform processing to increase the resolution of a variety of pieces of information with different resolutions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-231617, filed Nov. 14, 2014, which is hereby incorporated by reference wherein in its entirety.

What is claimed is:

1. An information processing apparatus comprising:
   one or more processors; and
   a memory coupled to the one or more processors, the memory having instructions stored thereon which, when executed by the one or more processors, cause the information processing apparatus to:
   acquire first subject information and second subject information for the same subject;
   separate each of the first subject information and the second subject information into a high-frequency component and a low-frequency component;
   correct the second subject information for at least part of an area of the second subject information based on a result of the separating; and
   determine a similarity between the first subject information and the second subject information by calculating a correlation between the low-frequency component of the first subject information and the low-frequency component of the second subject information,
wherein a corrected high-frequency component for at least the part of the area of the second subject information is generated based on the high-frequency component of the first subject information, and the second subject information is restored by using the low-frequency component of the second subject information and the corrected high-frequency component, and
wherein the corrected high-frequency component from the high-frequency component of the first subject information is generated and the corrected high-frequency component is taken to be a high-frequency component of the second subject information in a case where the correlation is equal to or higher than a threshold value.

2. The information processing apparatus according to claim 1, wherein the memory stores further instructions, which when executed by the one or more processors, cause the information processing apparatus to:
determine a similarity between the first subject information and the second subject information by calculating a correlation between the high-frequency component of the first subject information and the high-frequency component of the second subject information,
wherein a corrected low-frequency component from the low-frequency component of the first subject information is generated and the corrected low-frequency component is taken to be a low-frequency component of the second subject information in a case where the correlation is equal to or higher than a threshold value.

3. The information processing apparatus according to claim 1, wherein the memory stores further instructions, which when executed by the one or more processors, cause the information processing apparatus to:
correct the second subject information for each area of subject information.

4. The information processing apparatus according to claim 1, wherein the first subject information and the second subject information include information generated from a plurality of pieces of subject information representing the same physical quantity measured under different conditions.

5. The information processing apparatus according to claim 1, wherein the first subject information and the second subject information include color information, luminance information, shadow information, concavo-convex information, distance information, and gloss information.

6. The information processing apparatus according to claim 1, wherein the memory stores further instructions, which when executed by the one or more processors, cause the information processing apparatus to display a user interface with which it is possible for a user to specify a degree of correction.

7. The information processing apparatus according to claim 6, wherein the degree of correction can be specified for each area of subject information.

8. The information processing apparatus according to claim 1,
wherein the threshold value is set for each frequency of subject information.

9. The information processing apparatus according to claim 1,
wherein the threshold value is set for each area of subject information.

10. An information processing method comprising:
acquiring first subject information and second subject information for the same subject;
separating each of the first subject information and the second subject information into a high-frequency component and a low-frequency component;
correcting the second subject information for at least part of an area of the second subject information based on a result of the separating; and
determining a similarity between the first subject information and the second subject information by calculating a correlation between the low-frequency component of the first subject information and the low-frequency component of the second subject information,
wherein a corrected high-frequency component for at least the part of the area of the second subject information is generated based on the high-frequency component of the first subject information, and the second subject information is restored by using the low-frequency component of the second subject information and the corrected high-frequency component, and
wherein the corrected high-frequency component from the high-frequency component of the first subject information is generated and the corrected high-frequency component is taken to be a high-frequency component of the second subject information in a case where the correlation is equal to or higher than a threshold value.

11. A non-transitory computer readable storage medium storing a program causing a computer to perform an information processing method comprising:
acquiring first subject information and second subject information for the same subject;
separating each of the first subject information and the second subject information into a high-frequency component and a low-frequency component;
correcting the second subject information for at least part of an area of the second subject information based on a result of the separating; and
determining a similarity between the first subject information and the second subject information by calculating a correlation between the low-frequency component of the first subject information and the low-frequency component of the second subject information,
wherein a corrected high-frequency component for at least the part of the area of the second subject information is generated based on the high-frequency component of the first subject information, and the second subject information is restored by using the low-frequency component of the second subject information and the corrected high-frequency component,
wherein the corrected high-frequency component from the high-frequency component of the first subject information is generated and the corrected high-frequency component is taken to be a high-frequency component of the second subject information in a case where the correlation is equal to or higher than a threshold value.

* * * * *